(12) United States Patent
Kim

(10) Patent No.: US 8,994,703 B2
(45) Date of Patent: Mar. 31, 2015

(54) DISPLAY APPARATUS HAVING BIMETAL ELEMENT WHICH CAN BE CONTROLLABLY BENT

(75) Inventor: Tae-Eun Kim, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 139 days.

(21) Appl. No.: 13/428,638

(22) Filed: Mar. 23, 2012

(65) Prior Publication Data

US 2013/0155032 A1    Jun. 20, 2013

(30) Foreign Application Priority Data

Dec. 20, 2011  (KR) .......................... 10-2011-0138493

(51) Int. Cl.
| | |
|---|---|
| G06F 3/038 | (2013.01) |
| G09G 5/00 | (2006.01) |
| G09G 3/36 | (2006.01) |
| G09G 3/30 | (2006.01) |
| G02F 1/1333 | (2006.01) |
| G06F 1/16 | (2006.01) |

(52) U.S. Cl.
CPC ........ *G06F 1/1652* (2013.01); *G02F 1/133305* (2013.01); *G02F 2001/133388* (2013.01)
USPC ................................ 345/204; 345/87; 345/76

(58) Field of Classification Search
USPC .................................. 345/204–215, 690–699
See application file for complete search history.

(56) References Cited

U.S. PATENT DOCUMENTS

| | | | |
|---|---|---|---|
| 5,684,722 A * | 11/1997 | Thorner et al. .................... | 703/3 |
| 2006/0202933 A1* | 9/2006 | Pasch et al. ...................... | 345/94 |
| 2009/0021468 A1* | 1/2009 | Pankaj et al. ................. | 345/102 |
| 2010/0117975 A1 | 5/2010 | Cho ............................... | 345/173 |
| 2010/0188422 A1* | 7/2010 | Shingai et al. ................ | 345/647 |

FOREIGN PATENT DOCUMENTS

| | | | |
|---|---|---|---|
| KR | 10-2004-0085311 | | 10/2004 |
| KR | 10-2006-0078700 | | 7/2006 |
| KR | 1020100113869 | * | 10/2010 |
| KR | 1020100113869 A | * | 10/2010 |
| KR | 10-2011-0006787 | | 1/2011 |
| KR | 1020110006787 | * | 1/2011 |
| KR | 1020110006787 A | * | 1/2011 |
| KR | 10-2011-0068352 | | 6/2011 |

* cited by examiner

Primary Examiner — Aneeta Yodichkas
Assistant Examiner — Brent D Castiaux
(74) Attorney, Agent, or Firm — Robert E. Bushnell, Esq.

(57) ABSTRACT

A display apparatus includes: a substrate having a display area and anon-display area; a display device formed on the display area; a bending embodiment unit formed on the non-display area and including bimetal elements; and a control unit for controlling bending of each of the bimetal elements so as to improve convenience to the user.

14 Claims, 3 Drawing Sheets

DISPLAY APPARATUS HAVING BIMETAL ELEMENT WHICH CAN BE CONTROLLABLY BENT

CLAIM OF PRIORITY

This application makes reference to, incorporates the same herein, and claims all benefits accruing under 35 U.S.C. §119 from an application earlier filed in the Korean Intellectual Property Office on the 20 Dec. 2011 and there duly assigned Serial No. 10-2011-0138493.

BACKGROUND OF THE INVENTION

1. Field of the Invention

The present invention relates to a display apparatus, and more particularly, to a display apparatus which provides improved convenience to the user.

2. Description of the Related Art

Recently, display apparatuses have been replaced with portable thin film flat panel display apparatuses. Among various flat panel display apparatuses, a flexible display apparatus that is bent when a user wants it to be is drawing attention because its application and use ranges are widened.

However, it is difficult for a user to bend a display apparatus to a desired bending degree when he or she wants. In particular, when a user applies force to a display apparatus until the display apparatus is bent to a desired bending degree, and then the applied force is removed, the display apparatus does not maintain its bending and returns to its original shape.

In conclusion, there is a limit to improvement of the convenience to the user during use of the display apparatus because it is practically difficult to bend a display apparatus during a desired time period.

SUMMARY OF THE INVENTION

The present invention provides a display apparatus that provides improved convenience to the user.

According to an aspect of the present invention, there is provided a display apparatus including: a substrate having a display area and a non-display area; a display device formed on the display area; a bending embodiment unit that is formed on the non-display area and comprises bimetal elements; and a control unit for controlling bending of each of the bimetal elements.

The control unit may control a voltage applied to each of the bimetal elements.

The control unit individually may control a voltage applied to each of the bimetal elements.

The bending embodiment unit may be disposed facing a side of the display area and another side of the display area facing the side.

The number of bimetal elements of the bending embodiment unit disposed on the side of the display area may be the same as the number of bimetal elements of the bending embodiment unit disposed on the another side of the display area.

The bimetal elements of the bending embodiment unit disposed on the side of the display area may be disposed in correspondence to the bimetal elements of the bending embodiment unit disposed on the another side of the display area.

The control unit may be connected to the bimetal elements via a plurality of conductive line elements that are separated from each other.

The display apparatus may further include a plurality of thin film transistors disposed between the control unit and the bimetal elements.

The thin film transistors may be respectively disposed in correspondence to the bimetal elements.

Each of the thin film transistors may include an end that is electrically connected to the control unit via a common interconnection line, an end that is electrically connected to a corresponding bimetal element from among the bimetal elements, and an end that is electrically connected to the control unit via a plurality of conductive line elements which are separated from each other.

The control unit may include a shape process unit and a conductive line control unit that receives a signal transmitted by the shape process unit, wherein the shape process unit is connected to the common interconnection line, and the conductive line control unit is connected to the conductive line elements.

The display apparatus may further include a driving circuit unit for transmitting, to the display device, a signal for driving the display device, wherein the control unit is electrically connected to the driving circuit unit.

The display apparatus may further include an input signal unit that produces a signal required by the driving circuit unit, and transmits the signal to the driving circuit unit.

The substrate may include a flexible material.

The display device may be a liquid crystalline device or an organic light-emitting device.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
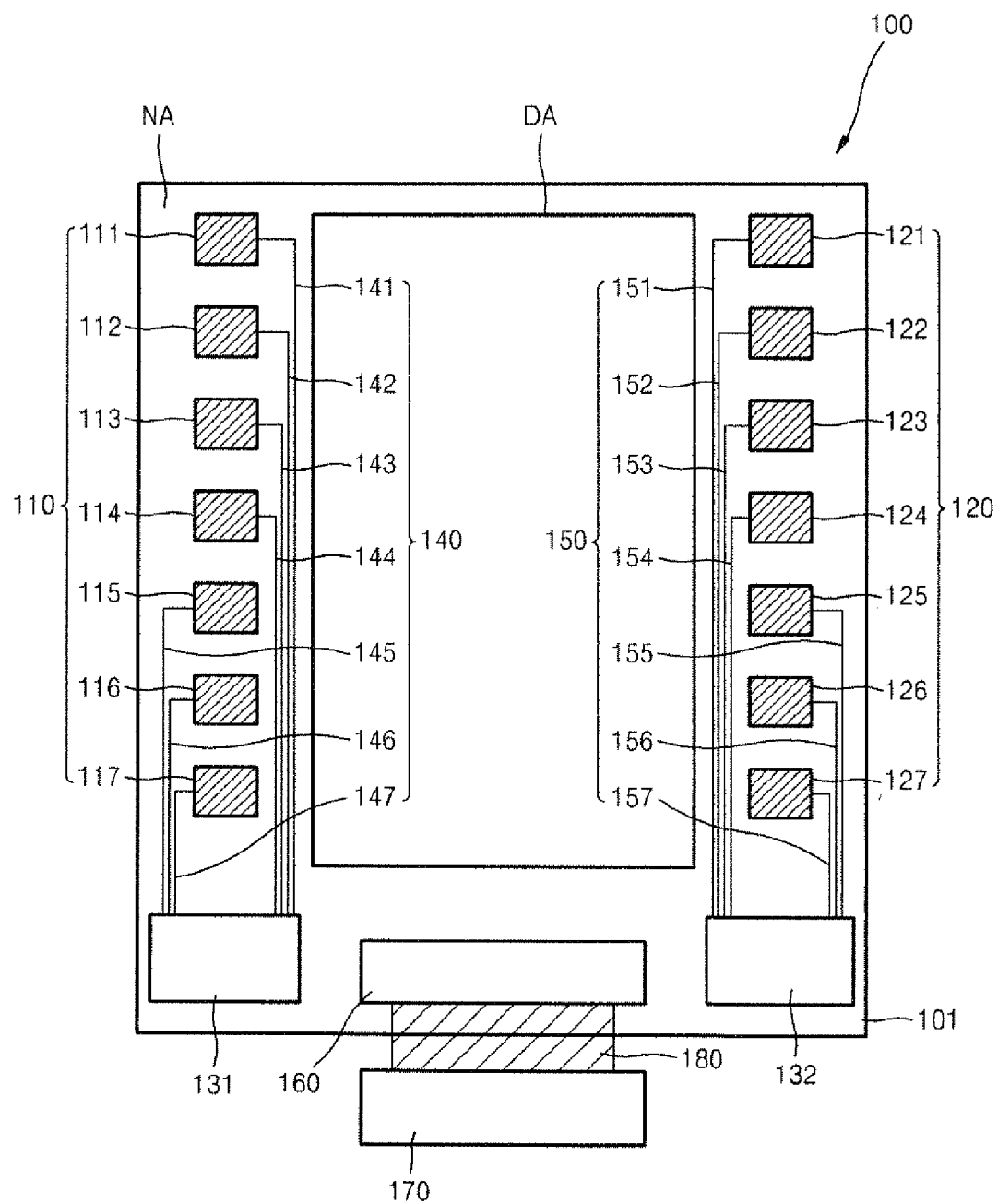
FIG. 1 is a schematic plan view of a display apparatus according to an embodiment of the present invention.

FIG. 1 is a schematic plan view of a display apparatus according to an embodiment of the present invention.

Referring to FIG. 1, the display apparatus 100 includes a substrate 101 including a display area DA and a non-display area NA, a bending embodiment unit, and a control unit.

Although not illustrated in the display area DA, a plurality of display devices may be formed thereon to embody an image that is recognized by a user. The display devices may be of various types, for example, liquid crystalline devices or organic light-emitting devices.

The substrate 101 may be formed of a flexible material. For example, the substrate 101 may be formed of a plastic material. In this regard, the plastic material used to form the substrate 101 may include at least one of various organic materials.

The non-display area NA of the substrate 101 may be disposed adjacent to the display area DA. In detail, the non-display area NA may be disposed on at least one side of the display area DA. For example, referring to FIG. 1, the display area DA is disposed in a central portion of the substrate 101 and the non-display area NA is disposed surrounding the display area DA.

The bending embodiment unit is disposed on the non-display area NA. In detail, the bending embodiment unit includes a first bending embodiment unit 110 and a second bending embodiment unit 120.

The first bending embodiment unit 110 is disposed facing a side of the display area DA (that is, as illustrated in FIG. 1, the left side of the display area DA), and the second bending embodiment unit 120 is disposed facing another side of the display area DA (that is, as illustrated in FIG. 1, the right side of the display area DA).

The first bending embodiment unit 110 includes a plurality of bimetal elements 111, 112, 113, 114, 115, 116 and 117.

The second bending embodiment unit 120 includes a plurality of bimetal elements 121, 122, 123, 124, 125, 126 and 127.

The control unit includes a first control unit 131 and a second control unit 132.

The first control unit 131 is connected to each of the bimetal elements 111, 112, 113, 114, 115, 116 and 117 of the first bending embodiment unit 110. In detail, the bimetal elements 111, 112, 113, 114, 115, 116 and 117 are connected to the first control unit 131 via a plurality of conductive line elements 141, 142, 143, 144, 145, 146 and 147, respectively, of a first conductive line unit 140 which are separated from each other. By doing so, the first control unit 131 may control a voltage applied to each of the bimetal elements 111, 112, 113, 114, 115, 116 and 117.

By controlling a voltage applied to each of the bimetal elements 111, 112, 113, 114, 115, 116 and 117, the first control unit 131 controls heat generated by the bimetal elements 111, 112, 113, 114, 115, 116 and 117, thereby enabling bending of the bimetal elements 111, 112, 113, 114, 115, 116 and 117, controlling a degree of the bending, and controlling a bending maintenance time.

The second control unit 132 is connected to each of the bimetal elements 121, 122, 123, 124, 125, 126 and 127 of the second bending embodiment unit 120. In detail, the bimetal elements 121, 122, 123, 124, 125, 126 and 127 are connected to the second control unit 132 via a plurality of conductive line elements 151, 152, 153, 154, 155, 156 and 157, respectively, of a second conductive line unit 150 which are separated from each other. By doing so, the second control unit 132 may control a voltage applied to each of the bimetal elements 121, 122, 123, 124, 125, 126 and 127.

By controlling a voltage applied to each of the bimetal elements 121, 122, 123, 124, 125, 126 and 127, the second control unit 132 controls heat generated by the bimetal elements 121, 122, 123, 124, 125, 126 and 127, thereby enabling bending of the bimetal elements 121, 122, 123, 124, 125, 126 and 127, controlling a degree of the bending, and controlling a bending maintenance time.

In this regard, the bimetal elements 111, 112, 113, 114, 115, 116 and 117 of the first bending embodiment unit 110 may be formed in correspondence to the bimetal elements 121, 122, 123, 124, 125, 126 and 127 of the second bending embodiment unit 120. That is, the bimetal elements 111, 112, 113, 114, 115, 116 and 117 of the first bending embodiment unit 110 may be respectively disposed in parallel with the bimetal elements 121, 122, 123, 124, 125, 126 and 127 of the second bending embodiment unit 120. The parallel arrangement may enable symmetric bending of the display apparatus 100. However, the present invention is not limited thereto. According to another embodiment of the present invention, the bimetal elements 111, 112, 113, 114, 115, 116 and 117 of the first bending embodiment unit 110 and the bimetal elements 121, 122, 123, 124, 125, 126 and 127 of the second bending embodiment unit 120 may be alternately disposed relative to each other. According to another embodiment of the present invention, the number of bimetal elements of the first bending embodiment unit 110 may be different from the number of bimetal elements of the second bending embodiment unit 120.

On the non-display area NA of the substrate 101, a driving circuit unit 160 and an input circuit unit 170 may be formed. The driving circuit unit 160 may be an integrated circuit (IC), and may transmit a signal for driving the display apparatus 100 to the display area DA. In detail, the input circuit unit 170 produces, for example, a driving signal and transmits the driving signal to the driving circuit unit 160, and the driving circuit unit 160 may directly transmit the driving signal to the display area DA, or it may process the driving signal according to required conditions, and then may transmit the processed signal to the display area DA.

The driving circuit unit 160 is electrically connected to the input circuit unit 170 by using, for example, a flexible printed circuit (FPC) 180.

The display apparatus 100 according to the present embodiment includes the bending embodiment units 110 and 120 including the bimetal elements 111, 112, 113, 114, 115, 116, 117, 121, 122, 123, 124, 125, 126 and 127. Also, the control units 131 and 132 control a voltage applied to the bimetal elements 111, 112, 113, 114, 115, 116, 117, 121, 122, 123, 124, 125, 126 and 127. In detail, the bimetal elements 111, 112, 113, 114, 115, 116, 117, 121, 122, 123, 124, 125, 126 and 127 are connected to the control units 131 and 132 via the conductive line elements 141, 142, 143, 144, 145, 146, 147, 151, 152, 153, 154, 155, 156 and 157, respectively.

Because a voltage applied to the bimetal elements 111, 112, 113, 114, 115, 116, 117, 121, 122, 123, 124, 125, 126 and 127 is individually controlled, heat generated by the bimetal elements 111, 112, 113, 114, 115, 116, 117, 121, 122, 123, 124, 125, 126 and 127 is also individually controlled. Accordingly, bending of the bimetal elements 111, 112, 113, 114, 115, 116, 117, 121, 122, 123, 124, 125, 126 and 127 is individually controlled.

Thus, the bending of the display apparatus 100 may be easily controlled. For example if a user wants to bend the display apparatus 100 to form a cylindrical shape, the control units 131 and 132 apply a relatively high voltage to the bimetal element 111 and the bimetal element 121 which are disposed closest to a top side of the substrate 101 so that the bimetal element 111 and the bimetal element 121 are bent to a relatively large degree. Likewise, the control units 131 and 132 apply a relatively high voltage, which is similar to the voltage applied to the bimetal element 111 and the bimetal element 121, to the bimetal element 117 and the bimetal element 127 which are disposed closest to a bottom side of the substrate 101 so that the bimetal element 117 and the bimetal element 127 are bent to a relatively large degree Also, the control units 131 and 132 apply a relatively low voltage to the bimetal element 114 and the bimetal element 124 which are disposed far from the edge of the substrate 101 so that the bimetal element 114 and the bimetal element 124 are bent to a relatively small degree. By doing this, the upper and lower sides of the display apparatus 100 of FIG. 1 contact each other or are bent to face each other.

In particular, even after a user causes the upper and lower sides of the display apparatus 100 to contact each other or to be bent to face each other, and then the applied force is removed, the bending may be maintained constant. Thus, convenience to the user may be improved.

The bending control described above is just an example, and the present invention is not limited thereto. That is, the display apparatus 100 may be bent in various other shapes, and the bending shapes may also be maintained for a desired time period.

Figure 2:
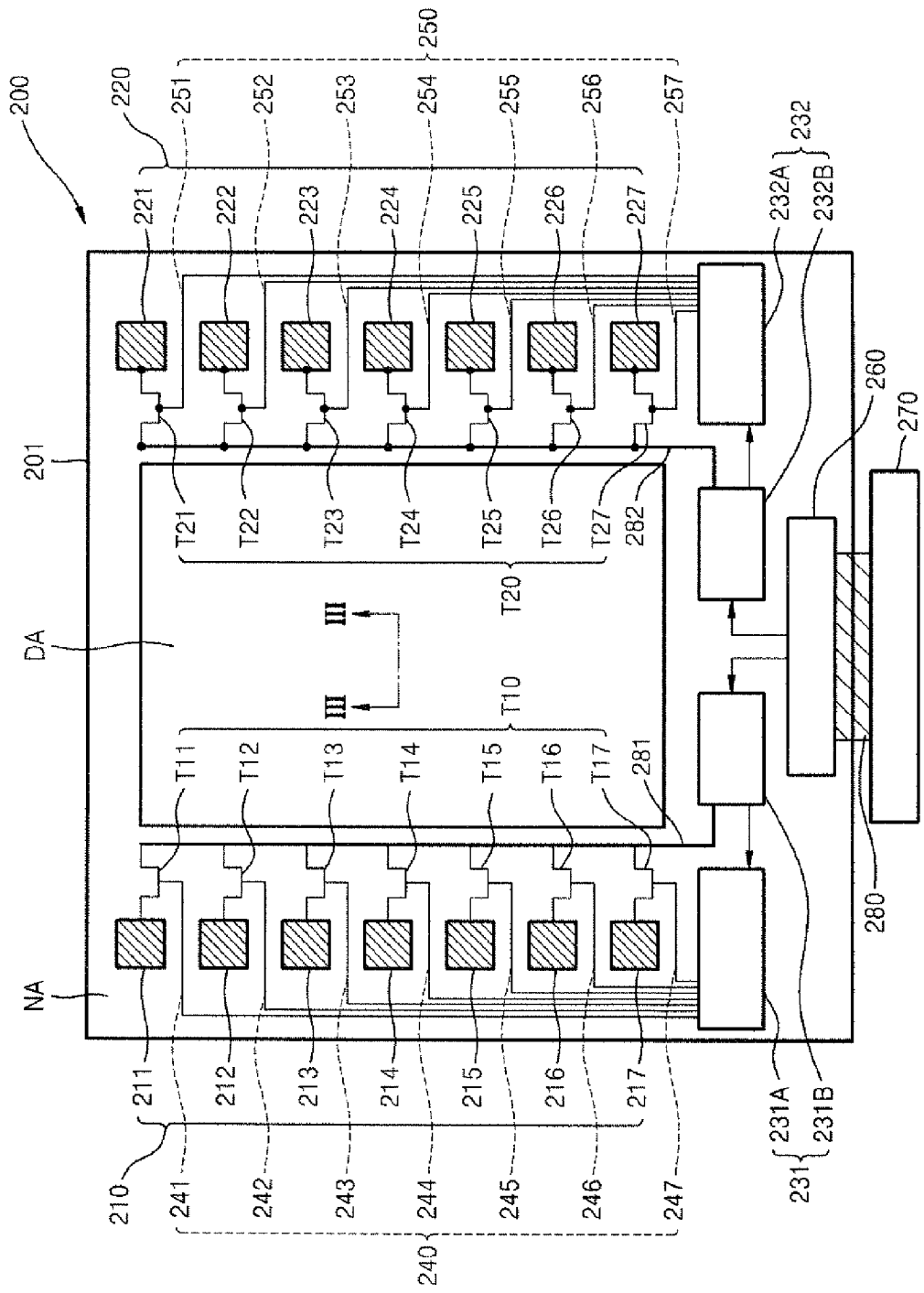
FIG. 2 is a schematic plan view of a display apparatus according to another embodiment of the present invention.

FIG. 2 is a schematic plan view of a display apparatus according to another embodiment of the present invention.

Referring to FIG. 2, the display apparatus 200 includes a substrate 201 including a display area DA and a non-display area NA, a bending embodiment unit, a thin film transistor (TFT) unit, and a control unit.

Figure 3:
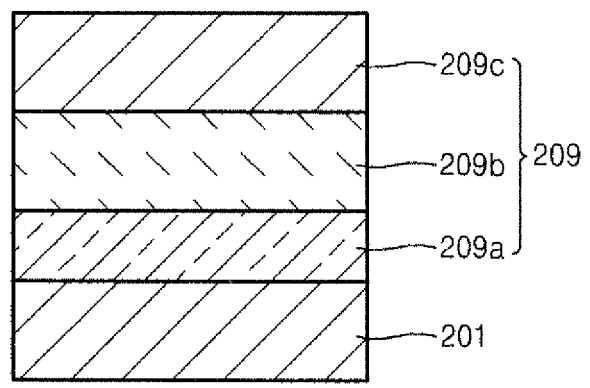
FIG. 3 is a cross-sectional view taken along a line III-III of a display area illustrated in FIG. 2.
Figure 4:
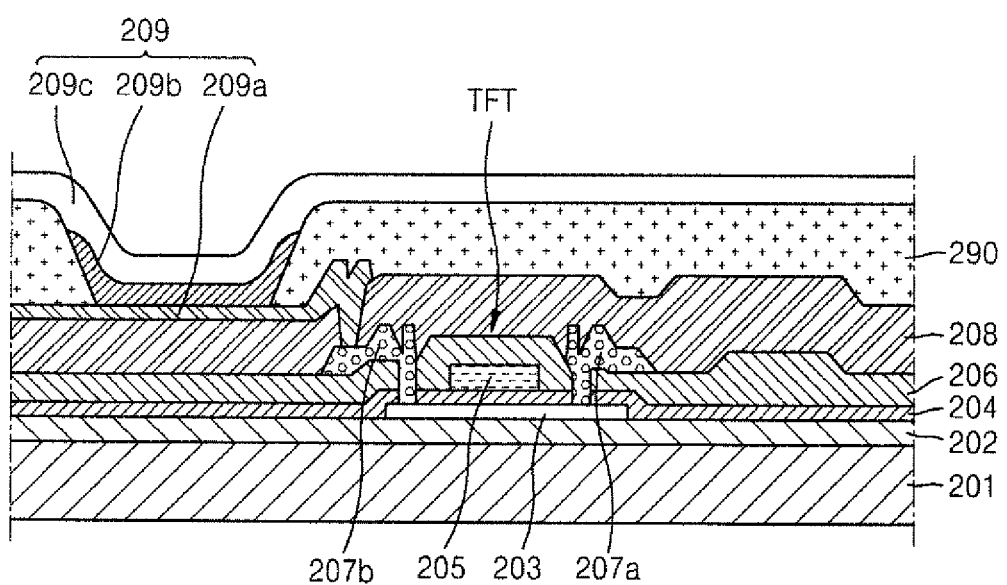
FIG. 4 is a cross-sectional view of another example of the display area illustrated in FIG. 2.

In the display area DA, a plurality of display devices may be formed so as to embody an image that is recognized by a user. The display devices may be of various types, for example, liquid crystalline devices or organic light-emitting devices. As an example of the display devices, an organic light-emitting device 209 is illustrated in FIGS. 3 and 4. The organic light-emitting device 209 is now described in detail below.

The non-display area NA of the substrate 201 may be disposed adjacent to the display area DA. In detail, the non-display area NA may be disposed on at least one side of the display area DA. For example, referring to FIG. 2, the display area DA is disposed in a central portion of the substrate 201 and the non-display area NA is disposed surrounding the display area DA.

The bending embodiment unit is disposed on the non-display area NA. In detail, the bending embodiment unit includes a first bending embodiment unit 210 and a second bending embodiment unit 220.

The first bending embodiment unit 210 is disposed facing a side of the display area DA, that is, as illustrated in FIG. 2, the left side of the display area DA, and, the second bending embodiment unit 220 is disposed facing another side of the display area DA, that is, as illustrated in FIG. 2, the right side of the display area DA.

The first bending embodiment unit 210 includes a plurality of bimetal elements 211, 212, 213, 214, 215, 216 and 217.

The second bending embodiment unit 220 includes a plurality of bimetal elements 221, 222, 223, 224, 225, 226 and 227.

The control unit includes a first control unit 231 and a second control unit 232.

The first control unit 231 includes a first conductive line control unit 231A and a first shape process unit 231B. Like the first control unit 231, the second control unit 232 includes a second conductive line control unit 232A and a second shape process unit 232B.

The TFT unit includes a first TFT unit T10 and a second TFT unit T20.

The first TFT unit T10 includes a plurality of TFTs T11, T12, T13, T14, T15, T16 and T17, and the second TFT unit T20 includes a plurality of TFTs T21, T22, T23, T24, T25, T26 and T27.

The TFTs T11, T12, T13, T14, T15, T16 and T17 of the first TFT unit T10 may respectively correspond to the bimetal elements 211, 212, 213, 214, 215, 216 and 217 of the first bending embodiment unit 210.

Ends of the TFTs T11, T12, T13, T14, T15, T16 and T17 of the first TFT unit T10 may be electrically connected to the bimetal elements 211, 212, 213, 214, 215, 216 and 217, respectively, of the first bending embodiment unit 210.

Also, other ends of the TFTs T11, T12, T13, T14, T15, T16 and T17 of the first TFT unit T10 may be electrically connected to the first shape process unit 231B. In detail, other ends of the TFTs T11, T12, T13, T14, T15, T16 and T17 of the first TFT unit T10 may be commonly connected to the first shape process unit 231B via a first common interconnection line 281. That is, the first shape process unit 231B may apply a common voltage to each of the TFTs T11, T12, T13, T14, T15, T16 and T17 via the first common interconnection line 281.

Also, other ends of the TFTs T11, T12, T13, T14, T15, T16 and T17 of the first TFT unit T10 may be electrically connected to the first conductive line control unit 231A, respectively. In detail, other ends of the TFTs T11, T12, T13, T14, T15, T16 and T17 of the first TFT unit T10 are connected to the first conductive line control unit 231A via a plurality of conductive line elements 241, 242, 243, 244, 245, 246 and 247 of a first conductive line unit 240 which are separated from each other.

Thus, the first conductive line control unit 231A individually controls a voltage applied to each of the TFTs T11, T12, T13, T14, T15, T16 and T17 of the first TFT unit T10 and thus, a voltage applied to each of the bimetal elements 211, 212, 213, 214, 215, 216 and 217 is individually controlled.

In conclusion, a voltage applied to each of the bimetal elements 211, 212, 213, 214, 215, 216 and 217 of the first bending embodiment unit 210 is individually controlled by the first control unit 231. Although, in FIG. 2, the first conductive line control unit 231A and the first shape process unit 231B of the first control unit 231 are distinguished from each other, the present invention is not limited thereto. For example, in the first control unit 231, the first conductive line control unit 231A and the first shape process unit 231B may be integrally formed.

The TFTs T21, T22, T23, T24, T25, T26 and T27 of the second TFT unit T20 may respectively correspond to the bimetal element 221, 222, 223, 224, 225, 226 and 227 of the second bending embodiment unit 220.

Ends of the TFTs T21, T22, T23, T24, T25, T26, and T27 of the second TFT unit T20 are electrically connected to the bimetal element 221, 222, 223, 224, 225, 226 and 227, respectively, of the second bending embodiment unit 220.

Also, other ends of the TFTs T21, T22, T23, T24, T25, T26 and T27 of the second TFT unit T20 may be electrically connected to the second shape process unit 232B. In detail, other ends of the TFTs T21, T22, T23, T24, T25, T26 and T27 of the second TFT unit T20 may be commonly connected to the second shape process unit 232B via a second common interconnection line 282. That is, the second shape process unit 232B may apply a common voltage to each of the TFTs T21, T22, T23, T24, T25, T26 and T27 via the second common interconnection line 282.

Also, other ends of the TFTs T21, T22, T23, T24, T25, T26 and T27 of the second TFT unit T20 are electrically connected to the second conductive line control unit 232A, respectively. In detail, other ends of the TFTs T21, T22, T23, T24, T25, T26 and T27 of the second TFT unit T20 are respectively connected to the second conductive line control unit 232A via a plurality of conductive line elements 251, 252, 253, 254, 255, 256 and 257 of a second conductive line unit 250.

Thus, the second conductive line control unit 232A individually controls a voltage applied to each of the TFTs T21, T22, T23, T24, T25, T26 and T27 of the second TFT unit T20, and thus a voltage applied to each of the bimetal element 221, 222, 223, 224, 225, 226 and 227 is individually controlled.

In conclusion, a voltage applied to each of the bimetal element 221, 222, 223, 224, 225, 226 and 227 is controlled by the second control unit 232. Although, in FIG. 2, the first conductive line control unit 232A and the first shape process unit 232B of the first control unit 232 are distinguished from each other, the present invention is not limited thereto. For example, in the first control unit 232, the first conductive line control unit 232A and the first shape process unit 232B of may be integrally formed On the non-display area NA of the substrate 201, a driving circuit unit 260 and an input circuit unit 270 may be formed. The driving circuit unit 260 may be an integrated circuit (IC) and may transmit a signal for driving the display apparatus 200 to the display area DA. In detail, the input circuit unit 270 produces, for example, a driving signal and transmits the driving signal to the driving circuit unit 260, and the driving circuit unit 260 may directly transmit the driving signal to the display area DA, or it may process the driving signal according to required conditions, and it may then transmit the processed signal to the display area DA.

The driving circuit unit 260 may be electrically connected to the input circuit unit 270 by using, for example, a flexible printed circuit (FPC) 280.

Also, the driving circuit unit 260 may be electrically connected to the control units 231 and 232. That is, the driving circuit unit 260 may transmit a desired signal to the conductive line control units 231A and 232A and the shape process units 231B and 232B of the control units 231 and 232, respectively. By doing this, the function of the control units 231 and 232 may be simplified, thereby minimizing the size of the control units 231 and 232, and thus enabling the production of a lightweight and slim display apparatus.

FIG. 3 is a cross-sectional view taken along a line III-III of FIG. 2. Referring to FIG. 3, the display device 209 disposed on the display area DA of the display apparatus 200 is now described in detail.

Referring to FIG. 3, the display device 209 is formed on the substrate 201. In the present embodiment, an organic light-emitting device is used as the display device 209.

The organic light-emitting device 209 includes a first electrode 209a, a second electrode 209c, and an intermediate layer 209b.

The first electrode 209a may function as an anode and the second electrode 209c may function as a cathode. According to another embodiment of the present invention, the first electrode 209a may function as a cathode and the second electrode 209c may function as an anode.

If the first electrode 209a functions as an anode, the first electrode 209a may include a high work function material, such as ITO, IZO, ZnO or $In_2O_3$. Also, selectively, the first electrode 209a may further include a reflection film formed of Ag, Mg, Al, Pt, Pd, Au, Ni, Nd, Ir, Cr, Li, Yb or Ca.

If the second electrode 209c functions as a cathode, the second electrode 209c may be formed of Ag, Mg, Al, Pt, Pd, Au, Ni, Nd, Ir, Cr, Li or Ca. Also, the second electrode 209c may include ITO, IZO, ZnO or $In_2O_3$.

The intermediate layer 209b includes an organic emissive layer, and when a voltage is applied to the first electrode 209a and the second electrode 209c, visible light is emitted so as to embody an image that is recognized by a user.

The intermediate layer 209b may be formed using a low molecular weight or polymer organic film. If the intermediate layer 209b is formed using a low molecular weight organic film, the intermediate layer 209b may be formed by depositing a hole injection layer (HIL), a hole transport layer (HTL), an organic emissive layer, an electron transport layer (ETL), and an electron injection layer (EIL), each of which may have a single-layer or multi-layer structure.

The HIL may be formed of a phthalocyanine compound, such as copper phthalocyanine, or a starburst-type amine, such as TCTA, m-MTDATA, or m-MTDAPB.

The HTL may be formed of N,N'-bis(3-methylphenyl)-N, N'-diphenyl-[1,1-biphenyl]-4,4'-diamine (TPD) or N,N'-di (naphthalene-1-yl)-N,N'-diphenyl benzidine (α-NPD).

The EIL may be formed of LiF, NaCl, CsF, $Li_2O$, BaO or Liq.

The ETL may be formed of Alq3.

The organic emissive layer may include a host material and a dopant material.

Examples of a host material are tris(8-hydroxy-quinolinato)aluminum (Alq3), 9,10-di(naphthy-2-yl)anthracene (AND), 3-Tert-butyl-9,10-di(naphthy-2-yl)anthracene (TBADN), 4,4'-bis(2,2-diphenyl-ethene-1-yl)-4,4'-dimethylphenyl (DPVBi), 4,4'-bisBis(2,2-diphenyl-ethene-1-yl)-4, 4'-dimethylphenyl (p-DMDPVBi), Tert(9,9-diarylfluorene)s (TDAF), 2-(9,9'-spirobifluorene-2-yl)-9,9'-spirobifluorene (BSDF), 2,7-bis(9,9'-spirobifluorene-2-yl)-9,9'-spirobifluorene (TSDF), bis(9,9-diarylfluorene)s (BDAF), 4,4'-bis(2,2-diphenyl-ethene-1-yl)-4,4'-di-(tert-butyl)phenyl (p-TD-PVBi), 1,3-bis(carbazol-9-yl)benzene (mCP), 1,3,5-tris (carbazol-9-yl)benzene (tCP), 4,4',4"-tris(carbazol-9-yl) triphenylamine (TcTa), 4,4'-bis(carbazol-9-yl)biphenyl (CBP), 4,4'-bisBis(9-carbazolyl)-2,2'-dimethyl-biphenyl (CBDP), 4,4'-bis(carbazol-9-yl)-9,9-dimethyl-fluorene (DMFL-CBP), 4,4'-bis(carbazol-9-yl)-9,9-bisbis(9-phenyl-9H-carbazol)fluorene (FL-4CBP), 4,4'-bis(carbazol-9-yl)-9, 9-di-tolyl-fluorene (DPFL-CBP), and 9,9-bis(9-phenyl-9H-carbazol)fluorene (FL-2CBP).

Examples of a dopant material are 4,4'-bis[4-(di-p-tolylamino)styryl]biphenyl (DPAVBi), 9,10-di(naph-2-tyl)anthracene (ADN), and 3-tert-butyl-9,10-di(naph-2-tyl)anthracene (TBADN).

A sealing element (not shown) may be disposed on the second electrode 209c. The sealing element (not shown) may be formed to protect the intermediate layer 209b and other layers from external humidity or oxygen, and the sealing element (not shown) may have an alternate multi-layer structure of a plastic or organic material and an inorganic material.

FIG. 4 is a cross-sectional view of another example of the display area illustrated in FIG. 2.

Referring to FIG. 4, a pixel TFT and the organic light-emitting device 209 are formed on the substrate 201.

The pixel TFT includes an active layer 203, a gate electrode 205, a source electrode 207a, and a drain electrode 207b.

A buffer layer 202 is formed on the substrate 201. The buffer layer 202 may include $SiO_2$ or $SiN_x$. The buffer layer 202 may provide a planar surface on the substrate 201, and may prevent permeation of humidity and impurities into the substrate 201.

The active layer 203 is formed in a predetermined pattern on the buffer layer 202. The active layer 203 may be formed of an inorganic semiconductor, such as amorphous silicon or polysilicon, or an organic semiconductor, and may include a source area, a drain area, and a channel area. The source and drain areas of the active layer 203 may be formed by doping the active layer 203 with a Group 3 or 5 element after the active layer 203 is formed using amorphous silicon or polysilicon.

A gate insulation film 204 may be formed on the active layer 203 and a gate electrode 205 is formed on a predetermined area of the gate insulation film 204. The gate insulation film 204 insulates the active layer 203 from the gate electrode 205, and may be formed of an organic material or an inorganic material, such as $SiN_x$ or $SiO_2$.

The gate electrode 205 may include Au, Ag, Cu, Ni, Pt, Pd, Al, Mo, or an alloy, such as an Al:Nd alloy, a Mo:W alloy. However, the material for forming the gate electrode 205 is not limited thereto, and various other materials may also be used to form the gate electrode 205 in consideration of an adhesion property with respect to an adjacent layer, a planarization property, an electric resistance, and a processability.

An interlayer insulation film 206 is formed on the gate electrode 205. The interlayer insulation film 206 and the gate insulation film 204 are formed so as to expose the source and drain areas of the active layer 203, and the source electrode 207a and the drain electrode 207b are formed so as to contact the exposed source and drain areas of the active layer 203.

The source electrode 207a and the drain electrode 207b may each be formed of various conductive materials, and may have a single- or multi-layer structure.

A passivation layer 208 is formed on the pixel TFT. In detail, the passivation layer 208 is formed on the source electrode 207a and the drain electrode 207b.

The passivation layer 208 is formed so as to expose a predetermined area of the drain electrode 207b, and the first electrode 209a of the organic light-emitting device 209 is formed so as to be connected to the exposed portion of the drain electrode 207b.

A pixel define film 290 is formed by using an insulating material on the first electrode 209a. The pixel define film 290 is formed so as to expose a predetermined area of the first electrode 209a, and the intermediate layer 209b is formed so as to be connected to the exposed portion of the first electrode 209a. Also, the second electrode 209c is formed so as to be connected to an exposed portion of the intermediate layer 209b.

A sealing element (not shown) may be disposed on the second electrode 209c. The sealing element (not shown) may be formed so as to protect the intermediate layer 209b and other layers from external humidity or oxygen, and the sealing element (not shown) may have an alternate multi-layer structure of a plastic or organic material and an inorganic material.

The display apparatus 200 includes the bending embodiment units 210 and 220, including the bimetal element 211, 212, 213, 214, 215, 216, 217, 221, 222, 223, 224, 225, 226 and 227. Also, a voltage applied to the bimetal element 211, 212, 213, 214, 215, 216, 217, 221, 222, 223, 224, 225, 226 and 227 is individually controlled by the control units 231 and 232.

Accordingly, bending of the bimetal element 211, 212, 213, 214, 215, 216, 217, 221, 222, 223, 224, 225, 226 and 227 is individually controlled.

In particular, by controlling on/off of the first TFT unit T10 and the second TFT unit T20, the beginning/finishing of the bending of the bimetal element 211, 212, 213, 214, 215, 216, 217, 221, 222, 223, 224, 225, 226 and 227 may be easily controlled. Also, by individually controlling a voltage applied to the first TFT unit T10 and the second TFT unit T20, a degree of bending of each of the bimetal element 211, 212, 213, 214, 215, 216, 217, 221, 222, 223, 224, 225, 226 and 227 may be easily controlled.

As described above, the bending of the display apparatus 200 is easily controlled and, even when a user does not apply force to the display apparatus 200, the bending of the display apparatus 200 may be maintained, thereby improving the convenience to the user.

The bending control described above is just an example, and the present invention is not limited thereto. That is, the display apparatus 200 may be bent in various other shapes, and the bending shapes may also be maintained for a desired time period.

A display apparatus according to the embodiments of the present invention may easily improve the convenience to the user.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A display apparatus, comprising:
   a substrate having a display area and a non-display area;
   a display device formed on the display area;
   a bending embodiment unit formed on the non-display area and including bimetal elements;
   a control unit for controlling bending of each of the bimetal elements; and
   a plurality of thin film transistors disposed between the control unit and the bimetal elements;
   wherein the thin film transistors are respectively disposed in correspondence to the bimetal elements:
   wherein each of the thin film transistors comprises an end that is electrically connected to the control unit via a common interconnection line, an end that is electrically connected to a corresponding bimetal element from among the bimetal elements, and an end that is electrically connected to the control unit via a plurality of conductive line elements which are separated from each other.

2. The display apparatus of claim 1, wherein the control unit controls a voltage applied to each of the bimetal elements.

3. The display apparatus of claim 1, wherein the control unit individually controls a voltage applied to each of the bimetal elements.

4. The display apparatus of claim 1, wherein the bending embodiment unit is disposed facing a first side of the display area and a second side of the display area facing the first side.

5. The display apparatus of claim 4, wherein the number of bimetal elements of the bending embodiment unit disposed on the first side of the display area is the same as the number of bimetal elements of the bending embodiment unit disposed on the second side of the display area.

6. The display apparatus of claim 4, wherein the bimetal elements of the bending embodiment unit disposed on the first side of the display area are disposed in correspondence to the bimetal elements of the bending embodiment unit disposed on the second side of the display area.

7. The display apparatus of claim 1, wherein the control unit is connected to the bimetal elements via a plurality of conductive line elements that are separated from each other.

8. The display apparatus of claim 1, wherein the control unit comprises a shape process unit and a conductive line control unit that receives a signal transmitted by the shape process unit; and
   wherein the shape process unit is connected to the common interconnection line, and the conductive line control unit is connected to the conductive line elements.

9. The display apparatus of claim 1, further comprising a driving circuit unit for transmitting a signal to the display device for driving the display device, wherein the control unit is electrically connected to the driving circuit unit.

10. The display apparatus of claim 9, further comprising an input signal unit that produces a signal required by the driving circuit unit, and transmits the signal to the driving circuit unit.

11. The display apparatus of claim 1, wherein the substrate comprises a flexible material.

12. The display apparatus of claim 1, wherein the display device is one of a liquid crystalline device and an organic light-emitting device.

13. A display apparatus, comprising:
a substrate having a display area and a non-display area;
a display device formed on the display area;
a bending embodiment unit formed on the non-display area and including bimetal elements;
a control unit for controlling bending of each of the bimetal elements; and
a plurality of thin film transistors disposed between the control unit and the bimetal elements;
wherein each of the thin film transistors comprises an end that is electrically connected to the control unit via a common interconnection line, an end that is electrically connected to a corresponding bimetal element from among the bimetal elements, and an end that is electrically connected to the control unit via a plurality of conductive line elements which are separated from each other.

14. A display apparatus, comprising:
a substrate having a display area and a non-display area;
a display device formed on the display area;
a bending embodiment unit formed on the non-display area and including bimetal elements;
a control unit for controlling bending of each of the bimetal elements; and
a plurality of thin film transistors disposed between the control unit and the bimetal elements;
wherein the control unit comprises a shape process unit and a conductive line control unit that receives a signal transmitted by the shape process unit; and
wherein the shape process unit is connected to a common interconnection line which connects each thin film transistor to the control unit, and the conductive line control unit is connected to conductive line elements which connect the thin film transistors to the control unit.

* * * * *

UNITED STATES PATENT AND TRADEMARK OFFICE
CERTIFICATE OF CORRECTION

| | | |
|---|---|---|
| PATENT NO. | : 8,994,703 B2 | Page 1 of 1 |
| APPLICATION NO. | : 13/428638 | |
| DATED | : March 31, 2015 | |
| INVENTOR(S) | : Tae-Eun Kim et al. | |

It is certified that error appears in the above-identified patent and that said Letters Patent is hereby corrected as shown below:

On the Title Page

Item 12   Should read

Kim, et al.

Item 75   Should read

Tae-Eun Kim, Yongin (KR)

Soonryong Park, Yongin (KR)

Kyuseok Kim, Yongin (KR)

Signed and Sealed this
Second Day of February, 2016

Michelle K. Lee
*Director of the United States Patent and Trademark Office*